(12) United States Patent
Shimada

(10) Patent No.: US 6,647,014 B1
(45) Date of Patent: Nov. 11, 2003

(54) DISTRIBUTED NETWORK NODE

(75) Inventor: Naohiro Shimada, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/476,230

(22) Filed: Dec. 30, 1999

(30) Foreign Application Priority Data

Jan. 6, 1999 (JP) .......................................... 11-001487

(51) Int. Cl.$^7$ ............................................. H04L 12/28
(52) U.S. Cl. ...................... 370/400; 370/404; 370/405; 370/410; 370/276; 370/293; 359/113; 359/118
(58) Field of Search .......................... 370/229, 395.2, 370/230–234, 242, 252, 241.1, 400, 408, 403, 404, 405–407, 254, 256–258, 465, 236; 359/113, 118

(56) References Cited

U.S. PATENT DOCUMENTS

| | | | | |
|---|---|---|---|---|
| 5,353,282 A | * | 10/1994 | Dormer et al. ............. | 370/390 |
| 5,818,842 A | * | 10/1998 | Burwell et al. ............. | 370/397 |
| 5,867,481 A | * | 2/1999 | Miyagi ....................... | 370/244 |
| 5,907,551 A | * | 5/1999 | Nishio et al. ............. | 370/395.2 |
| 6,023,467 A | * | 2/2000 | Abdelhamid et al. .... | 370/236.2 |
| 6,108,304 A | * | 8/2000 | Abe et al. .................. | 370/232 |
| 6,226,293 B1 | * | 5/2001 | Sakayori .................. | 370/236.2 |
| 6,389,020 B1 | * | 5/2002 | Kim et al. ................. | 370/395.6 |
| 6,404,735 B1 | * | 6/2002 | Beshai et al. ............. | 370/230 |
| 6,404,740 B1 | * | 6/2002 | Yoshida .................... | 370/241.1 |
| 6,414,959 B1 | * | 7/2002 | Asano ..................... | 370/395.62 |
| 6,424,629 B1 | * | 7/2002 | Rubino et al. ........... | 370/241.1 |

FOREIGN PATENT DOCUMENTS

| | | |
|---|---|---|
| JP | 4-129348 | 4/1992 |
| JP | 8-97841 | 4/1996 |
| JP | 9-51310 | 2/1997 |
| JP | 10-4425 | 1/1998 |
| JP | 10-98524 | 4/1998 |

OTHER PUBLICATIONS

Japanese Office Action issued Mar. 6, 2001 in a related application with English translation if relevant portions.

* cited by examiner

*Primary Examiner*—Douglas Olms
*Assistant Examiner*—Van Nguyen
(74) *Attorney, Agent, or Firm*—Dickstein, Shapiro, Morin & Oshinsky, LLP.

(57) ABSTRACT

A single node is constituted by a core node that carries out overall management of the node and extended nodes that are connected by transmission lines to the core node. The core node comprises: an Operation Administration & Maintenance (OAM) function part for managing the extended nodes; N common function parts for receiving and outputting by way of transmission lines OAM signals generated by the OAM function part and main signals, and an aggregate-side interface. The extended nodes each comprise individual interfaces and a common function part for processing main signals and OAM signals that are communicated over the transmission lines. The core node and extended nodes are each arranged in appropriate locations and are each housed in individual cases.

34 Claims, 8 Drawing Sheets

DISTRIBUTED NETWORK NODE

BACKGROUND OF THE INVENTION

1. Field of the Invention

The present invention relates to a distributed network node, and particularly to a distributed network node in which children stations are remotely arranged and to a distributed network management method.

2. Description of the Related Art

One of the anticipated characteristics of a communication connection device is the remote installation of extended nodes (children stations). This characteristic is desirable because the interfaces in a communication connection device that provide various services may be distributed, rather than being concentrated in one fixed location. Communication connection devices are usually installed in locations that are convenient to users, and more compact and inexpensive devices are therefore always being sought, and the development of each individual interface must be simplified. At the same time, the varieties of interfaces cover a wide spectrum, and it is therefore necessary to aim for a design that can optimize the physical size, power consumption, and thermal characteristics necessary for each individual interface, to allow for flexible alteration or expansion of functions, and to accommodate alteration of specifications according to use. A distributed network nodes that enables independent development of each individual function is therefore in demand.

Japanese Patent Laid-open No. 98524/98 is one example of such a distributed network. In the distributed network in this invention, an exchange node that integrates a control system device and speech system device in the prior art is separated into a control system node, which includes a control system, and a speech channel system node, which includes the speech channel system; a plurality of speech channel system nodes being controlled by a plurality of control system nodes.

However, a problem in the prior-art distributed network node as explained hereinabove was the difficulty of optimizing or reducing the size and cost of the case that constitutes each node. In the prior-art distributed network, each control system node and speech channel system node that make up each individual node was provided in a single case. As a result, all of the functions necessary as a node had to be incorporated into each individual case for each individual control system node or speech channel system node, and this necessity made it difficult to provide a case that optimizes the necessary functions, or to make the case smaller or less expensive.

In particular, an approach has become necessary that can handle, on the network-side, the types of terminal-side entities such as a LAN that are now increasing in variety. When it comes to applying these interface variations to the network, the variations must be considered one by one in the network, and building a wide range of interfaces into a single case placed a considerable load on each node. As a result, there was difficulty in reducing size, lowering costs, and optimizing, and a suitable remote arrangement of nodes was not possible.

SUMMARY OF THE INVENTION

The present invention was developed in view of these problems, and has as an object the provision of a distributed network nodes in which nodes are smaller and less expensive, and moreover, easy to optimize, and that allow independent development of necessary interface functions.

To achieve the above-described objects, the invention described in the first claim of the present invention is a distributed network node of a network, in which main signals are sent to and from the distributed network node. The distributed network node comprises a core node and a plurality of extended nodes. The core node comprises: an Operation Administration & Maintenance (OAM) function part for generating OAM signals used to manage the extended nodes, and a common function part for carrying out the processes of transmitting and receiving main signals to and from both the network and the extended nodes and transmitting and receiving the OAM signals to and from the extended nodes. Each extended node comprises: an interface function part for carrying out interface processing for that extended node; and a common function part for processing main signals received from the core node.

According to the distributed network node of the first invention of the present application having the above-described configuration, the core node, which is the parent station, is provided with OAM functions for managing extended nodes and common transmitting/receiving functions with the extended nodes. In addition, the extended nodes, which are child nodes, need not be physically incorporated in the core node, and may have independent individual interface function parts. Furthermore, since the extended nodes are controlled by the core node, there is no need to provide OAM function parts in the extended nodes, and the optimum interface functions for each individual environment can be provided. Extended nodes can therefore be made smaller, less expensive, and the extended node case can be independently developed, thereby allowing a design that optimizes physical size, power consumption, and heat characteristics.

In the invention described in claim 2 of the present invention, the extended nodes and core node described in the first claim are each arranged at prescribed locations and housed in independent cases, and connected by transmission lines for exchanging the main signals and the OAM signals.

According to the distributed network node of the second invention of the present application having the above-described configuration, the extended nodes need not be physically incorporated in the core node, and extended nodes can be connected to the core node by main signals and control signals and installed remote from the core node. In addition, optimum extended nodes that are adapted to their environment can be arranged because their cases can be designed according to the installation locations.

The invention described in the third claim of the present invention is a distributed network node in which the common function parts of the extended nodes described in the first and second claims each further include: receiving means for receiving the same signal transmitted over two differing routes; comparing means for comparing both signals that are received by the receiving means; and selecting means for selecting one of the signals according to the result of the comparing means.

According to the distributed network node of the third invention of the present application having the above-described configuration, when transmitting the same signal over two differing routes from the transmission section of a node, the signal can be reliably received despite the occurrence of a fault on either of the paths by selecting on the receiver side the signal that has not been affected by the fault.

The invention described in claim 4 of the present invention is a distributed network node in which the common function part and interface function part of each of the extended nodes described in claims 1, 2, and 3 are connected only by signal lines for exchanging the main signals and the OAM signals.

According to the distributed network node of the invention of the fourth invention of the present application having the above-described configuration, the connection section of an extended node is constituted by a circuit that is common to the core node, and interface function parts can be individually selected, whereby the mode of connection with each signal (main signals and OAM signals) can be easily developed to match the environment.

In addition, the invention described in claim 5 of the present invention is a distributed network node in which the extended nodes and the core node in the inventions described in claims 1, 2, 3, and 4 are connected in a star configuration.

According to the distributed network node of the fifth invention of the present application having the above-described configuration, a plurality of extended nodes that provide various services from the core node can be connected by optical fiber or metallic or radio lines, and can be installed in locations separated from the core node. In addition, since the functions of the installed extended nodes can be constructed independently as appropriate to their environment, a design is possible that optimizes the physical size, power consumption, and thermal characteristics.

The invention described in claim 6 of the present invention is a distributed network node in which the extended nodes and core node in the invention described in claims 1,2,3, and 4 are connected in a ring configuration.

According to the distributed network node of the sixth invention of the present application having the above-described configuration, a more compact and less expensive core node is possible because only two extended node interfaces are required in the core node. In addition, if more extended nodes are provided, one end of the ring connection may be cut and the extended nodes then added. Additional nodes can be established without affecting the extended nodes even if faults in signals should occur due to cutting at this time, because one end of the connection remains in connection.

The invention described in claim 7 of the present invention is a distributed network node in which the extended nodes and core node in the invention described in claims 1, 2, 3, and 4 are connected in a double-ring configuration.

According to the distributed network node of the seventh invention of the present application having the above-described configuration, the distributed network nodes can be configured in a main ring and sub-ring by connecting nodes in a double-ring configuration; wherein the long-distance portion can be constituted by the main ring, and a campus, a mall, or small offices and home offices can be constituted by sub-rings from each extended node of the main ring, thereby achieving a node configuration that is balanced in terms of distance.

In addition, the invention described in claim 8 of the present invention is a distributed network node wherein the core node of claims 1, 2, 3, 4, 5, 6, and 7 is in duplex form.

According to the distributed network node of the eighth invention of the present application having the above-described configuration, a highly reliable core node can be provided by constituting the core node in duplex form, whereby the occurrence of a fault in one of the core nodes does not affect services that are provided to all nodes that are connected to the core node.

The invention described in claim 9 of the present invention is a distributed network node in which the extended nodes of the invention described in claims 1, 2, 3, 4, 6, 7, and 8 include a clock processing means that, when signals received from one side are outputted to the other side, outputs to the other side using a clock that is extracted from the received signals.

According to the distributed network node of the ninth invention of the present application having the above-described configuration, the extended nodes can be configured to use an extracted clock without including a clock source (oscillator) because the extended nodes are configured subordinate to the core node. In this case, signals are transmitted from the transmitting side by two different routes, and signals of one route can be received even if a fault should occur on the other route, thereby enabling highly reliable signal transfer in which the entire network is unaffected even without a clock source.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

The embodiments of the present invention are next explained with reference to the accompanying figures.

The distributed network node, which is one mode of an embodiment of the present invention, is made up of extended nodes having individual interface function parts, and a core node that manages the extended nodes. A network node that was provided in one case function part in the prior art is physically constituted by a plurality of case function parts made up of a core node and extended nodes. The entire structure including the core node and extended nodes is a single node on the network.

Explanation is first presented regarding the mode of connecting this type of core node and extended nodes, and the details of each individual node are explained later. The modes of connecting the core node and extended nodes that make up the distributed network node of this invention include a star configuration, a ring configuration, and a double-ring configuration.

Figure 1:
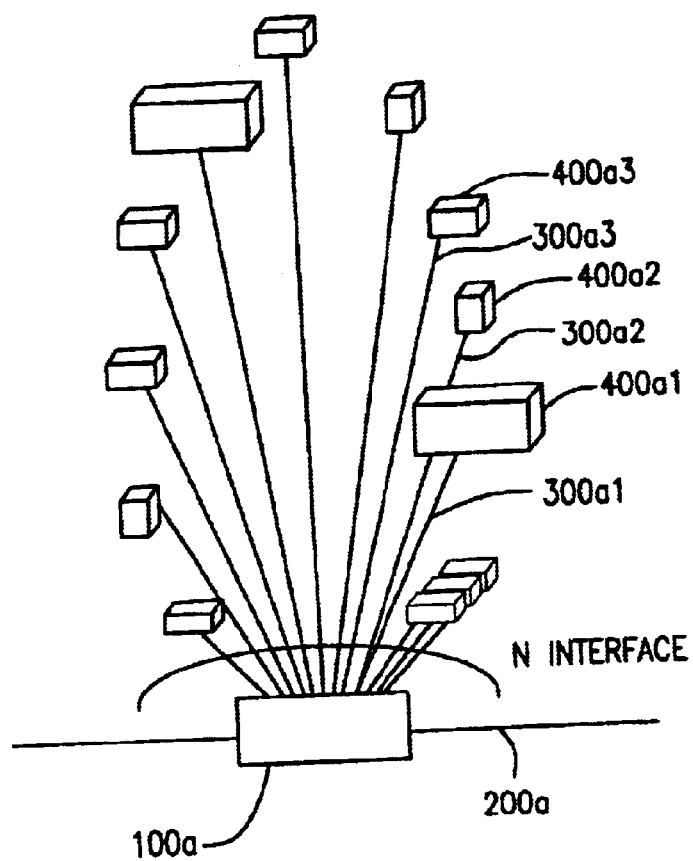
FIG. 1 shows an example of the configuration (star) of a distributed network node, which is a mode of an embodiment of the present invention.

To first explain the star configuration, FIG. 1 shows an example of the configuration (star) of a distributed network node, which is a mode of an embodiment of the present invention. In the distributed network node in star configuration according to the present invention, core node 100*a* that carries out overall management of the node and extended nodes 400*a*1, 400*a*2, and 400*a*3 connected to core node 100*a* by transmission lines 300*a*1, 300*a*2, and 300*a*3 make up a single node. The distributed network node in this star configuration is further connected by transmission line 200*a*. Core node 100*a* is connected to N extended nodes 400*an* (n=1, 2, . . . N) via transmission lines 300*an* (n=1, 2, . . . N). In addition, core node 100*a* includes: an Operation Administration & Maintenance (OAM) function part that controls extended nodes 400*an*; N common function parts that receive and output OAM signals generated by the OAM function part and main signals of the network by way of transmission lines 300*an*; and an aggregate-side interface that carries out input and output of signals with other core nodes via transmission line 200*a*. Further, core node 100*a* is arranged in an appropriate location as a single case function part. Transmission line 200*a* is a transmission line that communicates main signals with core node 100*a*. Transmission lines 300*an* are transmission lines that connect core node 100*a* and extended nodes 400*an*, and communicate main signals and OAM signals. These transmission lines 300*an* are a communication medium such as optical fiber or metallic or radio lines. Extended nodes 400*an* each include individual interfaces, i.e., interface function parts each adapted to the location in which they are installed; and a common function part for processing main signals and OAM signals that are communicated via transmission lines 300*an*. In addition, each of extended nodes 400*an* is arranged in an appropriate location and housed in its own individual case.

Explanation is next presented regarding the operation of the network node of this star configuration. In this star network node, main signals that are received and outputted via transmission line 200*a* are received at core node 100*a* and sent to extended nodes 400*an* via transmission lines 300*an*. These signals are then transmitted to external devices that are connected to extended nodes 400*an*. The main signals that are outputted from the external devices travel the reverse of this route, passing by way of extended nodes 400*an*, transmission lines 300*an*, and core node 100*a*, and are transmitted to the network. In addition, OAM signals generated by core node 100*a* are sent to extended nodes 400*an* by way of transmission lines 300*an*.

In a star network node of this configuration, extended nodes 400*an* can be separated from core node 100*a*, i.e., can be arranged in ideal locations, even though the combination of core node and extended nodes is a single node. In addition, since extended nodes 400*an* need not be physically incorporated into core node 100*a*, a design is possible that optimizes the physical size, power consumption, and thermal characteristics required for each interface required in each installation location. Furthermore, this configuration allows both independent development and flexible alteration of the necessary functions.

Figure 2:
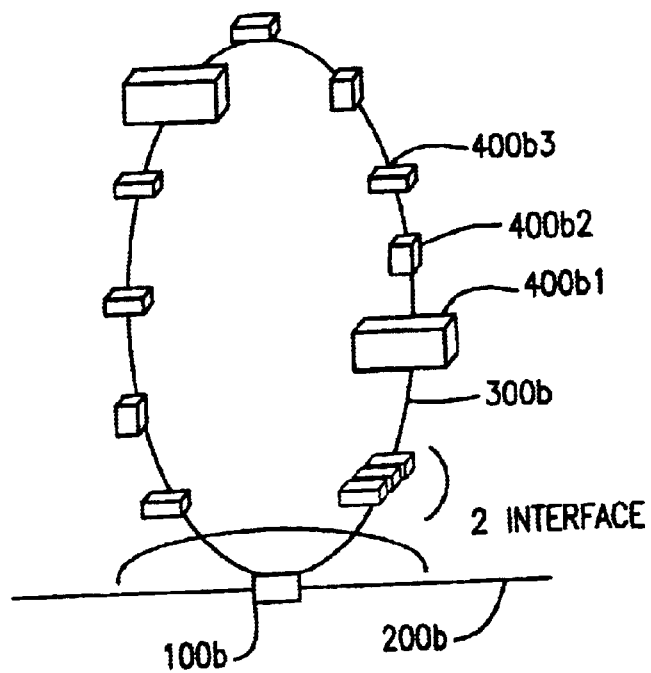
FIG. 2 shows an example of the configuration (ring) of a distributed network node, which is a mode of an embodiment of the present invention.

Explanation is next presented regarding the ring configuration as the second network node. FIG. 2 shows an example of the configuration (ring) of the distributed network node, which is a mode of an embodiment of the present invention. In the ring distributed network node according to this invention, core node 100*b*, which carries out overall management of the node, and extended nodes 400*b*1, 400*b*2, 400*b*3, which are connected to core node 100*b* in a ring configuration by transmission line 300*b*, together form a single node. The distributed network node of this type of configuration is further connected by transmission line 200*b*. Core node 100*b* is connected to N extended nodes 400*bn* (n=1, 2, . . . N) by ring transmission line 300*b*, and includes: two common function parts for carrying out input and output of main signals and OAM signals to and from extended nodes 400*bn* over transmission line 300*b*; OAM function part for managing extended nodes 400*bn*; and an aggregate-side interface that carries out input and output of signals with other core nodes via transmission line 200*b*. Transmission line 300*b* is a transmission line that connects core node 100*b* and extended nodes 400*bn* in a ring configuration. The composition of transmission line 200*b* and extended nodes 400*bn* is equivalent to that of the above-described star configuration and explanation is therefore here omitted.

The operation of the ring network node of this configuration is next explained. In this ring network node, as in the above-described star network node, main signals that are received and outputted via transmission line 200*b* are received at core node 100*b* and sent to the relevant extended nodes 400*bn* via transmission line 300*b*. The main signals further pass through extended nodes 400*bn* and are sent to external devices that are connected to extended nodes 400*bn*. Main signals that are outputted by the external devices are sent to the network by the reverse route. OAM signals generated by core node 100*b* are also sent to extended nodes 400*bn* by way of transmission line 300*b*.

This type of ring network node has the same merits as the star configuration of the first network node. In addition, with this ring connection, only two interface function parts are required at core node 100*b* regardless of the number of extended nodes 400*bn*, thereby enabling the realization of a more compact and less expensive core node 100*b*.

Further, when adding an extended node 400*b*, in contrast to the star configuration of the first network node shown in FIG. 1 in which new transmission lines 300*an* must be introduced between core node 100*a* and extended nodes 400*an*, the ring configuration of the second network node allows the simple addition of the new node after having once cut the ring at one point. This configuration therefore is better suited to network extensions, and in addition, since ring protection functions when the ring is cut, there is no effect on already existing service.

Figure 3:
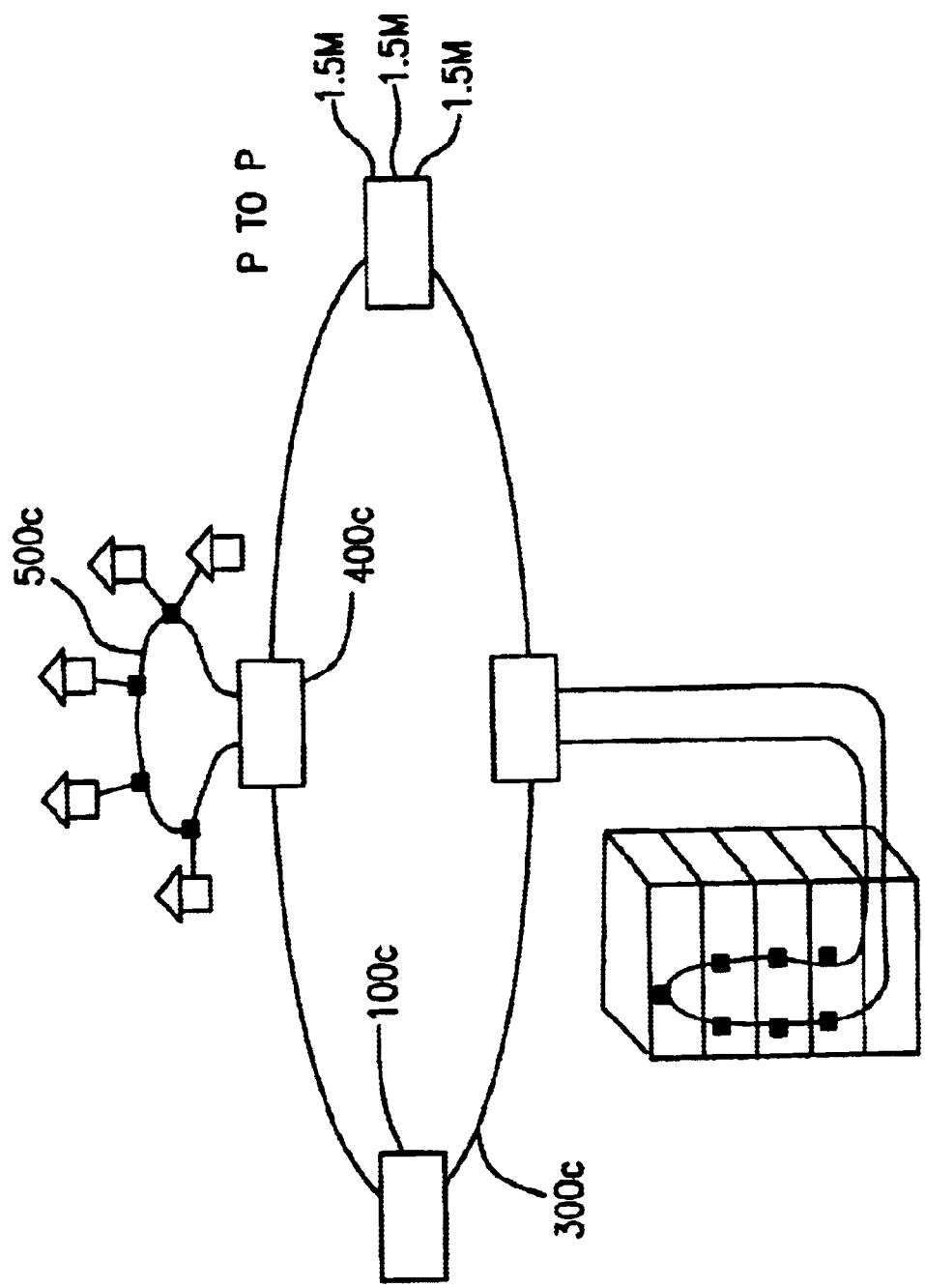
FIG. 3 shows an example of the configuration (double-ring) of a distributed network node, which is a mode of an embodiment of the present invention.

The double-ring configuration of the third network node is next explained. FIG. 3 shows an example of the configuration (double-ring) of the distributed network node, which is a mode of an embodiment of the present invention. A distributed network node according to this invention is made up of: core node 100*c* that carries out overall management of the node; extended node 400*c* that is connected to core node 100*c* by main ring 300*c*; and sub-ring 500*c* that connects extended node 400*c* with external devices. Core node 100*c* and extended node 400*c* are the same as core nodes 100*a* and 100*b* and extended nodes 400*a* and 400*b* of the above-described invention, and explanation is therefore here omitted. Main ring 300c is the same as transmission line 300b of the above-described ring network, and sub-ring 500c is a transmission line that connects a plurality of external devices to extended node 400c. The above-described transmission line 300b of the ring network is thus made up by main ring 300c and sub-ring 500c.

The operation of a double-ring network node of this configuration is next explained. In this network node in double-ring configuration, as in the above-described ring network node, main signals sent from the network are sent from core node 100c to extended nodes 400c by way of main ring 300c. The signals are in turn sent from extended nodes 400c to the object external device by way of sub-ring 500c.

A network node of this double-ring configuration has the same merits as the second network node of ring configuration. When connecting a distributed arrangement of terminals by a double-ring network node, the long-distance portion can be covered by the main ring, and the short portions of relatively short distance extending from the main ring can be covered by the sub-ring. These short portions may be, for example, a campus, a mall, a high-rise hill, residences, SOHO (small offices and home offices), and so on.

Figure 4:
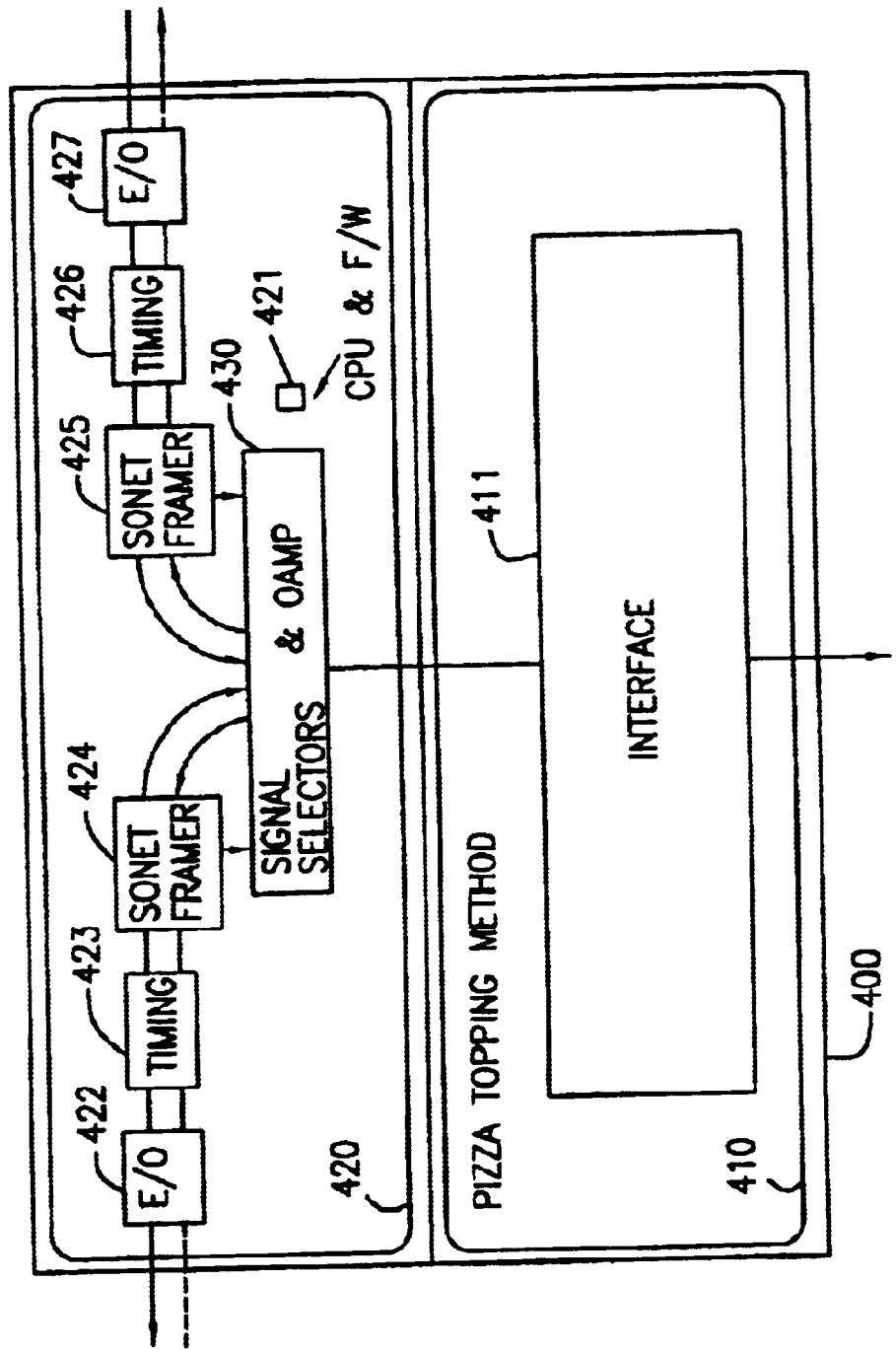
FIG. 4 is a block diagram of an extended node in a double-ring network node, which is a mode of an embodiment of the present invention.

The details of an extended node are next explained using the accompanying figures. FIG. 4 is a block diagram showing an extended node in the above-described ring network node. Extended node 400 according to this invention is made up of: interface function part 410 with an external device that is connected to the extended node; and common function part 420 that is connected with the core node or with another extended node. Main signals and OAM signals are received and outputted by a signal line that connects interface function part 410 and common function part 420. Interface function part 410 can be constituted independent of common function part 420 because signal lines that connect in this way are limited to a minimum. Interface function part 410 supports the interface functions of separate services, and is made up from interfaces 411 that take various modes according to their functions. The required physical size, power consumption, and thermal characteristics are optimally designed to produce ideal interfaces 411, which are added to interface function part 410 like a pizza topping (inserted). Common function part 420 is made up of: CPU & firmware 421 for carrying out overall processing of extended nodes 400; signal selectors and OAMP function part 430 for processing main signals and OAM signals (OAM: Operation, Administration, & Maintenance); SONETs (Synchronous Optical Networks) 424 and 425; timing circuits 423 and 426, and E/Os (Electric-Optic converters) 422 and 427. Since extended node 400 does not have OAM functions, CPU & firmware 421 may have the minimum necessary functions. In some cases, these functions can be realized by the hardware logic. of OAMP function part 430 without using a CPU.

In this extended node 400, the lack of OAM functions in common function part 420 reduces the load on the extended node, thereby enabling a smaller and less expensive extended node. In addition, common function part 420 is independent of the separate interface function part 410 and can therefore be used in all extended nodes. Furthermore, extended node 400 need not be physically incorporated in the core node, thereby allowing an optimized design in which each interface is given only the necessary physical size and power consumption and thermal characteristics. The basic constitution of the above-described extended node is the same as in the other star configuration and ring configuration.

Figure 5:
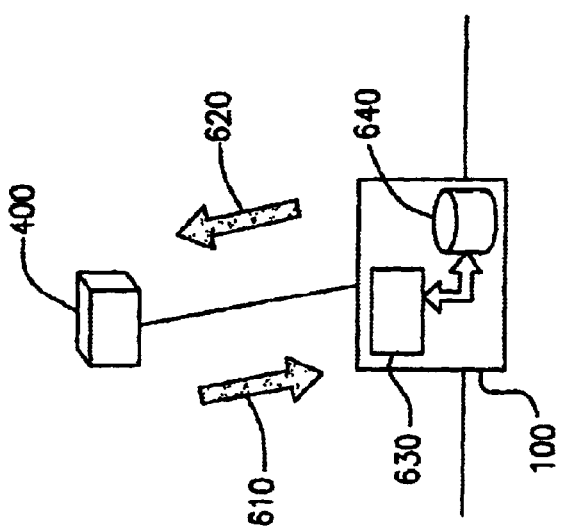
FIG. 5 shows path setting between a core node and an extended node, which is a mode of an embodiment of the present invention.

Explanation is next presented regarding the path setting of the Operation Administration & Maintenance (OAM) signals between extended node 400 and core node 100. FIG. 5 shows the path setting between the core node and the extended node, which is a mode of an embodiment of the present invention.

Since extended node 400 has a variety of interface function parts, the communication bands required for extended node 400 for the OAM signals of each of these interface function parts is different. Therefore, when connecting extended node 400 to core node 100, extended node 400 sends to core node 100 a connection notification signal and a setting request 610 of the communication band (volume of communication) of paths for OAM signals. Core node 100 then determines this band after adjusting communication bands that are necessary for, or perhaps already in use for, communication with other extended nodes, and in addition, after adjusting the processing load within the core node itself (630). Extended node 400 simultaneously determines the communication address (corresponding to a time slot in the case of STM (Synchronous Transfer Mode), and to an address in the case of IP/ATM (Internet Protocol/Asynchronous Transfer Mode). During these processes, determination is carried out by acquiring information from data base 640 that stores communication bands or communication addresses that are already in use by other extended nodes. This determined information is returned from core node 100 to the requesting extended node 400 (620). The extended node 400, having received the reply, begins communication with the core node using the communication band and communication addresses after adjustment.

In the case of the star configuration of the first network node, the core node and extended node are in a 1:1 connection, i.e., a point-to-point connection, and the portion of all bands in which communication is possible that remains after subtracting the band for main signals can be assigned as the communication band for OAM signals.

In the case of the ring configuration of the second network node, on the other hand, other extended nodes are generally present between the core node and a particular extended node, and the communication band for OAM signals by that extended node is therefore assigned from the portion of all communication bands in which communication is possible after subtracting not only the communication band that is required by that extended node for main signals, but also the communication bands that are required by the other interposed extended nodes for main signals and OAM signals. In either case, this assigning function is carried out by the core node or by an external device that is connected to the core node, and the extended node itself therefore can have a more compact or less expensive design.

Figure 6:
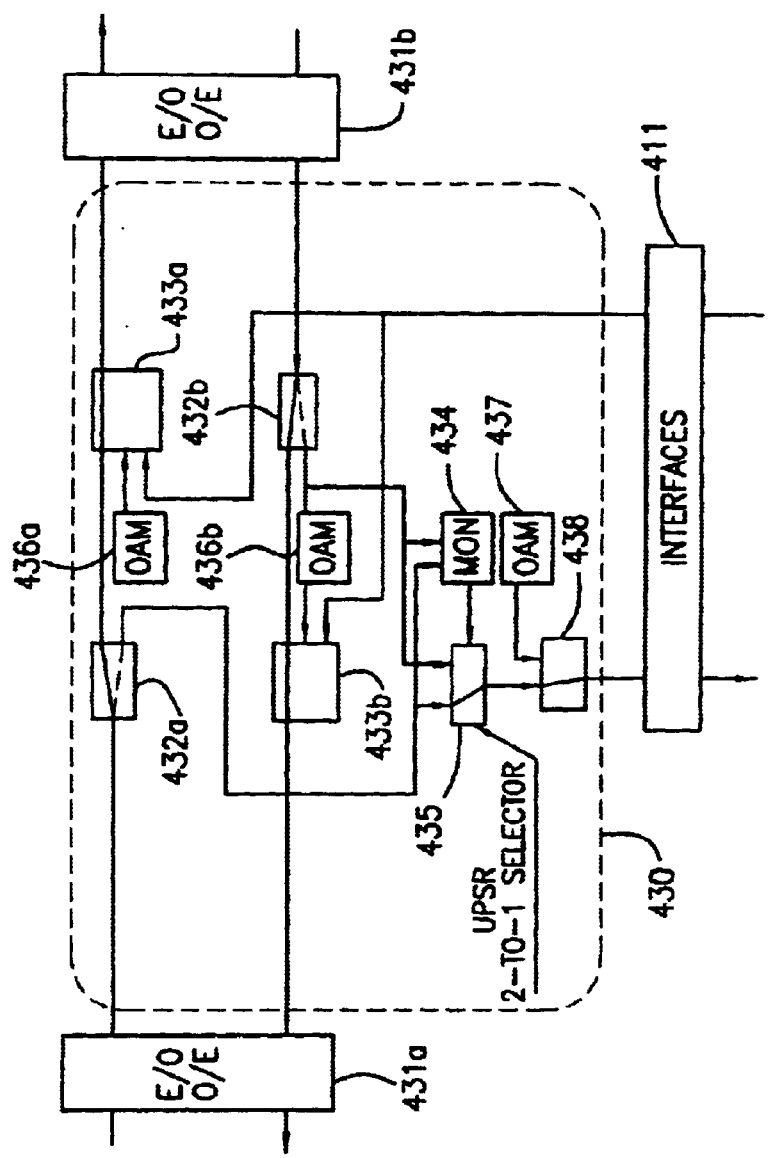
FIG. 6 shows an example of the configuration of the signal selector of an extended node, which is a mode of an embodiment of the present invention.

Explanation next regards a main-signal add/drop executing means in an extended node. FIG. 6 shows an example of the configuration of the signal selector & OAMP function part of an extended node, which is a mode of an embodiment of the present invention shown in FIG. 4. Signal selector & OAMP function part 430 is made up of: E/O and O/E (Optic-Electric converter) function parts 431a and 431b for converting communication signals and electrical signals; drop-side selectors 432a and 432b; add-side selectors 433a and 433b; monitor 434 for comparing dropped signals; selector 435 for selecting one of these dropped signals; OAM 436a, 436b, and 437 for processing OAM signals; and selector 438 for selecting main signals and OAM signals; selected signals being applied to interfaces 411.

The operation of signal selector & OAMP function part 430 of this composition is next explained. In an extended node for a case in which the extended node is connected to the core node in a ring configuration, only signals to be interfaced at that extended node are added or dropped. This selection is carried out at drop-side selectors 432a and 432b and add-side selectors 433a and 433b. In addition, OAM 436a and 436b that process OAM signals can also be inserted into add-side selectors. When using a UPSR (Unidirectional Path Protection Switched Self-Healing Ring) method, monitor 434 constantly compares the quality of two dropped signals that are sent by way of different routes, and one of the two signals is selected by selector 435. In this case, UPSR refers to a method of sending the same signal from the transmitting side by two different paths (since UPSR topology is a ring, the two paths are opposite directions on the ring), comparing both signals on the receiving side, and selecting the better signal. Essentially, this is a protection method in which a signal unaffected by a faults can be received despite. the occurrence of a fault on one of two routes by selecting the other route on the receiving side. Thus, a protection function is realized through the use of a UPSR method. Either main signals or OAM signals are selected by selector 438, and the signals are outputted to interface 411.

Figure 7:
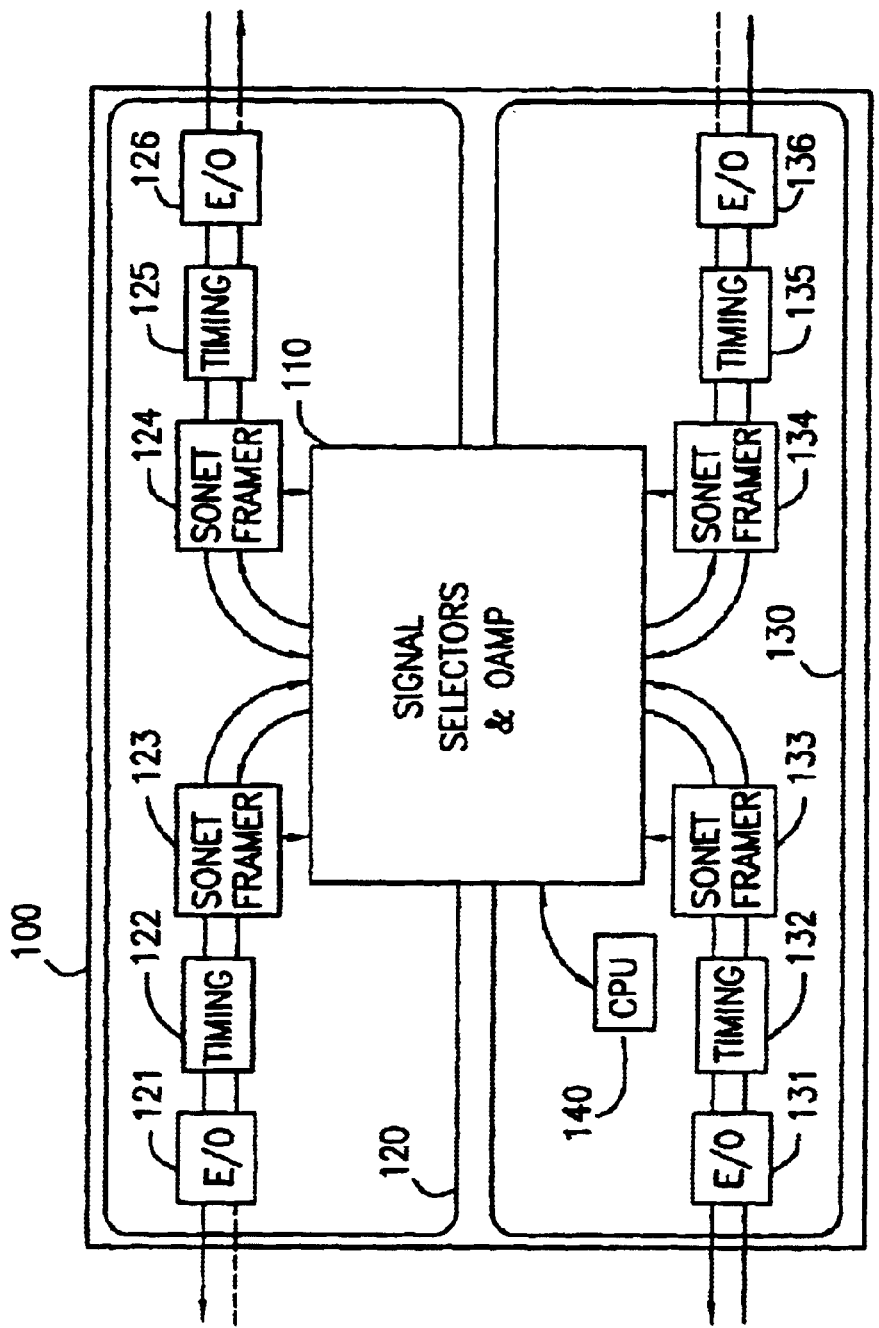
FIG. 7 is a block diagram of a double-ring core node, which is a mode of an embodiment of the present invention.

Next, regarding the core node, FIG. 7 is a block diagram of a core node of the double-ring configuration which is a mode of an embodiment of the present invention. Core node 100 according to this invention is made up of signal selectors & OAMP function part 110 for processing main signals and OAM signals; sub-ring interface function part 120 inside the core node; aggregate-side interface function part 130; and CPU 140, which is the Operation Administration & Maintenance (OAM) means for managing the core node and extended nodes. Sub-ring interface function part 120 has the same circuit structure as common function part 420 in extended node 400 shown in FIG. 4, and is made up of: SONETs 123 and 124 for processing main signals and OAM signals; timing circuits 122 and 125; and E/Os 121 and 126. In addition, aggregate-side interface function part 130 has the same basic circuit structure as sub-ring interface function part 120, and is made up of: SONETs 133 and 134 for processing main signals and OAM signals; timing circuits 132 and 135; and E/Os 131 and 136. However, since the main ring must cover a long distance compared to the sub-ring, there are differences such as variations in the devices E/O 131 and O/E 136. CPU 140 executes operation administration and maintenance of each of the extended nodes. The processing program that executes this control is recorded in, for example, firmware.

Figure 8:
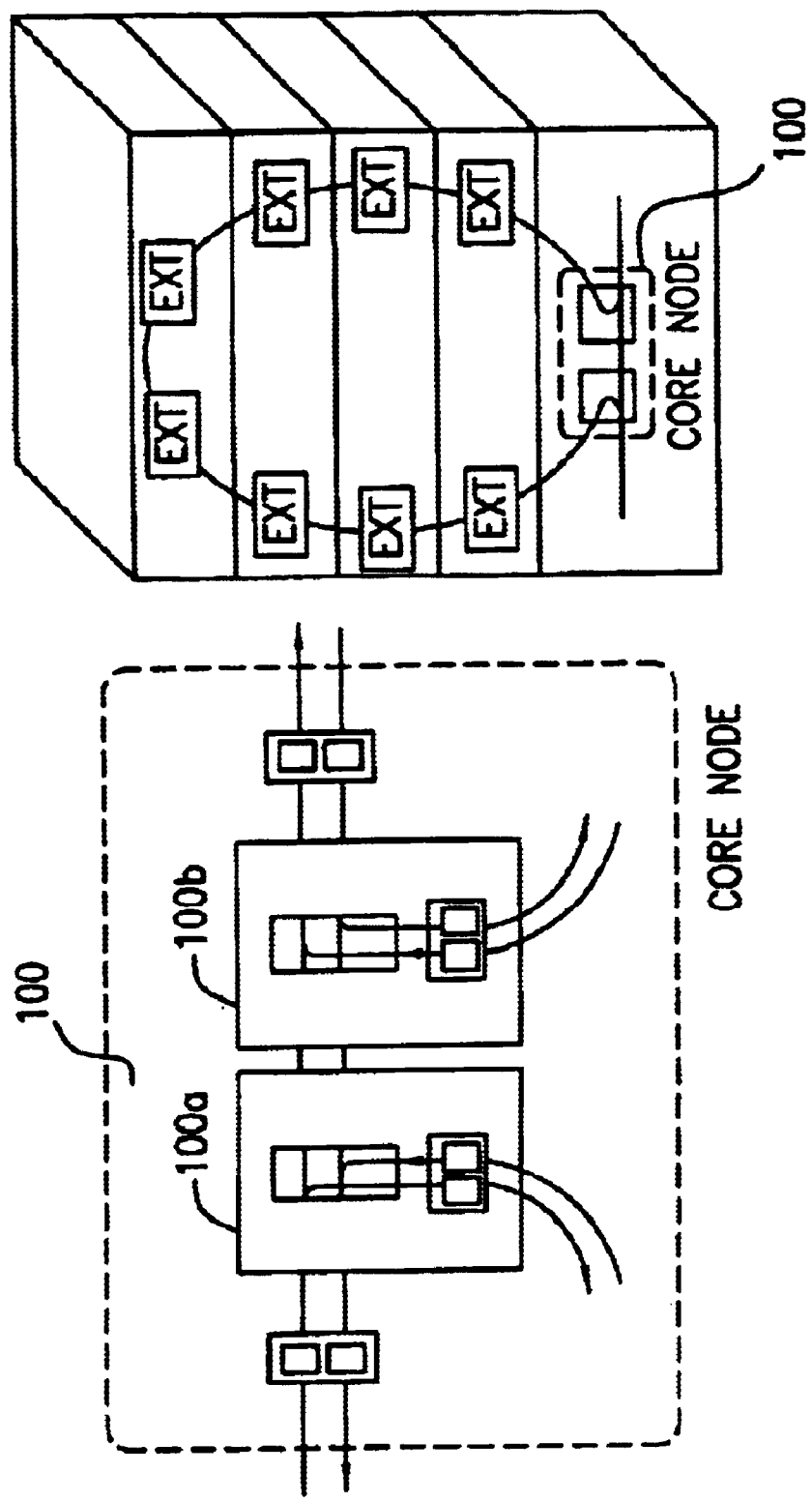
FIG. 8 shows a duplex core node, which is a mode of an embodiment of the present invention.

Since core node 100 according to the above description manages all of the extended nodes, high reliability is necessary, and core node 100 therefore may have duplex form to improve reliability. FIG. 8 shows core nodes in duplex form, which is a mode of an embodiment of the present invention. The interior of core node 100 is broadly divided into two, core node 100a being connected to one side on the sub-ring side and core node 100b being connected to the opposite side. Core nodes 100a and 100b are connected by interfaces inside the device. In a core node of this configuration, one of the divided core nodes 100a or 100b continues processing in the event that a fault occurs in the other core node.

Figure 9:
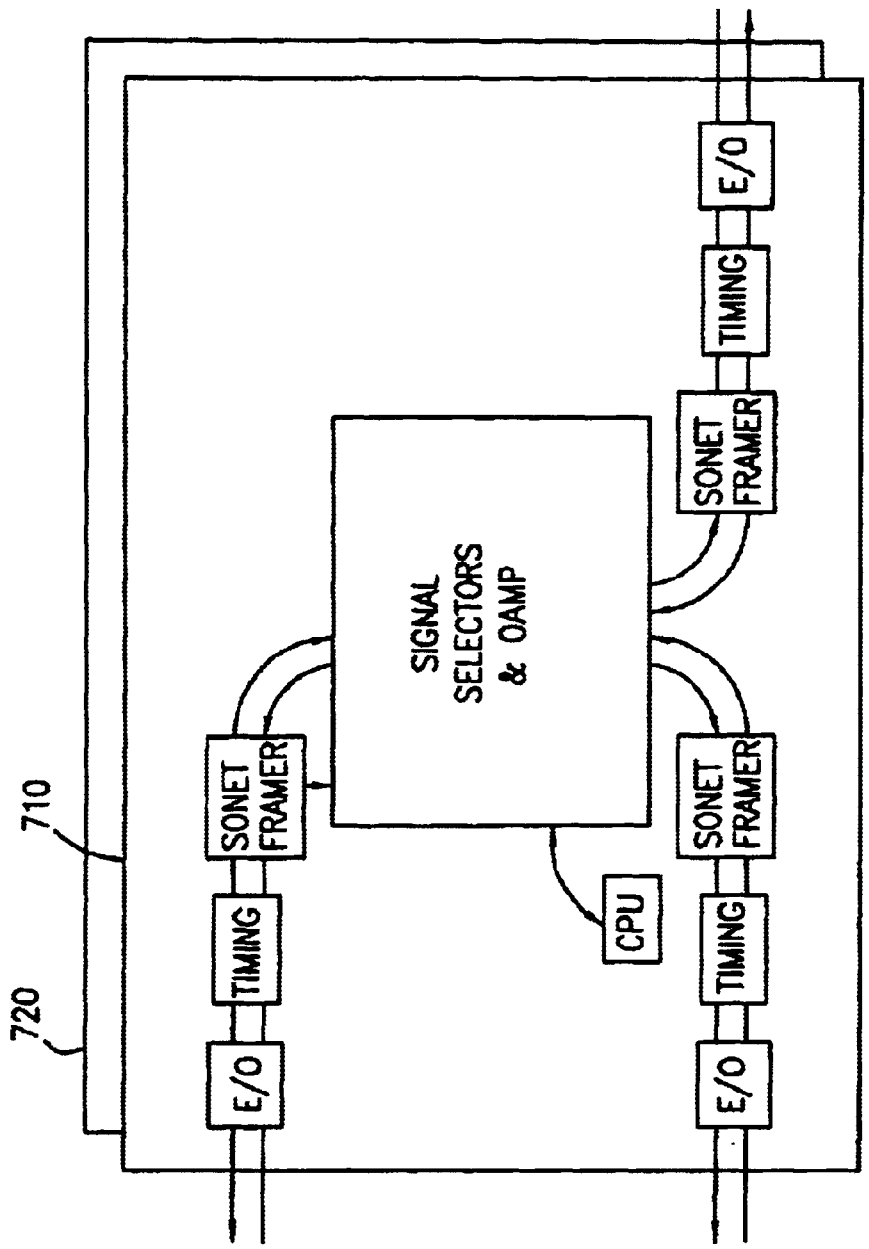
FIG. 9 shows a duplex core node, which is a mode of another embodiment of the present invention.

There is also a method of duplexing by eliminating one part from the core node circuit shown in FIG. 7 of the above-described invention. FIG. 9 shows a duplex core node that is a mode of another embodiment of the present invention. Core nodes 710 and 720 are circuits in which SONET 124, timing circuit 125, and E/O 126, which is the sub-ring interface function part, have been removed from the core node 100 shown in FIG. 7. It is therefore also possible to duplex by using the basic circuit of the core node shown in FIG. 7. If a fault should occur in the functions of either of core nodes 710 and 720, the other core node provides back-up and none of the services are affected. The core node in which break-down occurs can also be easily replaced.

In addition, the extended nodes of the above-described invention can also be realized without being provided with clock sources. Here, in a case in which a signal applied from the East side of the sub-ring is outputted to the West side, the West side can be outputted using the clock that is extracted from the East-side signal. Alternatively, in a case in which a signal that is applied from the West side of the sub-ring is outputted to the East side, the East side can be outputted using the clock extracted from the West-side signal. If by chance a fault should occur in the signal applied from the East side, the lack of a clock source may result in the interruption of the output to the West side, but the operation of UPSR of the above-described invention in such a case prevents any of the services from being affected. This use of an extracted clock enables the realization of extended nodes that lack a clock source (oscillator), whereby smaller and cheaper extended nodes can be realized.

Figure 10:
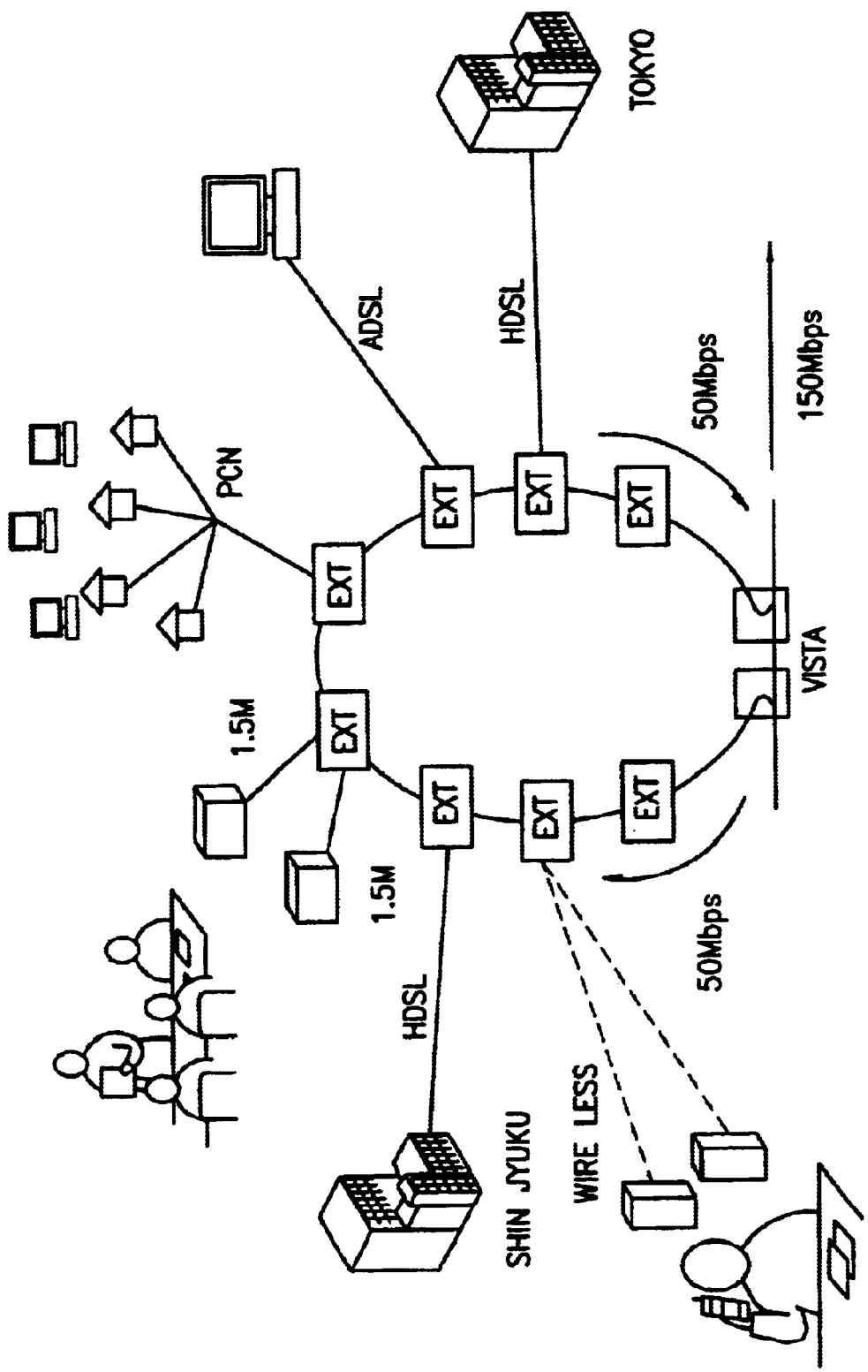
FIG. 10 shows an example of the application of a distributed network node, which is a mode of an embodiment of the present invention.

Explanation is next presented regarding an example of the actual application of the distributed network node, which is a mode of an embodiment of the present invention. FIG. 10 shows an example of the application of a distributed network node which is a mode of an embodiment of the present invention. In this example, a core node is connected to a 150-Mbps network, and eight extended nodes are connected to the core node in a ring configuration. The transmission line between the core node and the extended nodes is 50 Mbps. These extended nodes include a variety of interfaces such as HDSL (High Speed Digital Subscriber Line), ADSL (Asymmetric Digital Subscriber Line), PCN (Personal Communication Network), and radio interfaces.

In a distributed network node of this configuration, extended nodes can be arranged in appropriate locations. In a case in which nodes of the prior art are arranged as extended nodes, the prior-art nodes each include OAM functions, and division gives rise to division loss. In contrast, the OAM functions are concentrated in the core node in the distributed network node of the present invention and this type of division loss does not occur.

According to the distributed network node of the present invention, a single node is divided between a core node that manages and extended nodes that provide services and have separate interface function parts; and by connecting the extended nodes by, for example, optical fiber, a single node can be configured with extended nodes that are arranged at locations separated from the core node. In addition, since the extended nodes need not be physically incorporated in the core node, a design is possible that optimizes the physical size, power consumption, and thermal characteristics that are necessary to each individual interface, and necessary functions can be independently developed without affecting the core node. As a result, the development of a distributed network node is facilitated and functions can be flexibly altered.

While preferred embodiments of the present invention have been described using specific terms, such description is for illustrative purposes only, and it is to be understood that changes and variations may be made without departing from the spirit or scope of the following claims.

What is claimed is:

1. A distributed network node of a network, in which said distributed network node, said distributed network node comprising:
   a core node and a plurality of extended nodes;
   said core node comprising:
      an Operation Administration & Maintenance (OAM) function part for generating OAM signals used to manage said extended nodes; and a common function part for carrying out the processes of transmitting and receiving main signals to and from both the network and said extended nodes and transmitting and receiving the OAM signals to and from said extended nodes, each extended node comprising:

an interface function part for carrying out interface processing for that extended node; and a common function part for processing main signals and OAM signals received from said core node.

2. A distributed network node according to claim 1, wherein said extended nodes and said core node:

are each arranged in prescribed locations and housed in independent cases; and are connected by transmission lines for exchanging said main signals and OAM signals.

3. A distributed network node according to claim 1, wherein said common function parts of extended nodes further comprise:

receiving means for receiving a same signal transmitted over two different routes;

comparing means for comparing both signals that are received by said receiving means; and selecting means for selecting one of the signals according to results of said comparing means.

4. A distributed network node according to claim 2, wherein said common function parts of extended nodes further comprise:

receiving means for receiving a same signal transmitted over two different routes;

comparing means for comparing both signals that are received by said receiving-means; and selecting means for selecting one of the signals according to results of said comparing means.

5. A distributed network node according to claim 1, wherein said interface function parts and said common function parts of said extended nodes are connected only by signal lines for exchanging said main signals and OAM signals.

6. A distributed network node according to claim 2, wherein said interface function parts and said common function parts of said extended nodes are connected only by signal lines for exchanging said main signals and OAM signals.

7. A distributed network node according to claim 3, wherein said interface function parts and said common function parts of said extended nodes are connected only by signal lines for exchanging said main signals and OAM signals.

8. A distributed network node according to claim 1, wherein said extended nodes and said core node are connected in a star configuration.

9. A distributed network node according to claim 2, wherein said extended nodes and said core node are connected in a star configuration.

10. A distributed network node according to claim 3, wherein said extended nodes and said core node are connected in a star configuration.

11. A distributed network node according to claim 5, wherein said extended nodes and said core node are connected in a star configuration.

12. A distributed network node according to claim 1, wherein said extended nodes and said core node are connected in a ring configuration.

13. A distributed network node according to claim 2, wherein said extended nodes and said core node are connected in a ring configuration.

14. A distributed network node according to claim 3, wherein said extended nodes and said core node are connected in a ring configuration.

15. A distributed network node according to claim 5, wherein said extended nodes and said core node are connected in a ring configuration.

16. A distributed network node according to claim 1, wherein said extended nodes and said core node are connected in a double-ring configuration.

17. A distributed network node according to claim 2, wherein said extended nodes and said core node are connected in a double-ring configuration.

18. A distributed network node according to claim 3, wherein said extended nodes and said core node are connected in a double-ring configuration.

19. A distributed network node according to claim 5, wherein said extended nodes and said core node are connected in a double-ring configuration.

20. A distributed network node according to claim 1, wherein said core node is further in duplex form.

21. A distributed network node according to claim 2, wherein said core node is further in duplex form.

22. A distributed network node according to claim 3, wherein said core node is further in duplex form.

23. A distributed network node according to claim 5, wherein said core node is further in duplex form.

24. A distributed network node according to claim 8, wherein said core node is further in duplex form.

25. A distributed network node according to claim 12, wherein said core node is further in duplex form.

26. A distributed network node according to claim 16, wherein said core node is further in duplex form.

27. A distributed network node according to claim 1, wherein said extended nodes each include a clock processing means for, in a case in which a signal received from one side is outputted to another side, outputting to the other side using a clock extracted from a received signal.

28. A distributed network node according to claim 2, wherein said extended nodes each include a clock processing means for, in a case in which a signal received from one side is outputted to another side, outputting to the other side using a clock extracted from a received signal.

29. A distributed network node according to claim 3, wherein said extended nodes each include a clock processing means for, in a case in which a signal received from one side is outputted to another side, outputting to the other side using a clock extracted from a received signal.

30. A distributed network node according to claim 5, wherein said extended nodes each include a clock processing means for, in a case in which a signal received from one side is outputted to another side, outputting to the other side using a clock extracted from a received signal.

31. A distributed network node according to claim 8, wherein said extended nodes each include a clock processing means for, in a case in which a signal received from one side is outputted to another side, outputting to the other side using a clock extracted from a received signal.

32. A distributed network node according to claim 12, wherein said extended nodes each include a clock processing means for, in a case in which a signal received from one side is outputted to another side, outputting to the other side using a clock extracted from a received signal.

33. A distributed network node according to claim 16, wherein said extended nodes each include a clock processing means for, in a case in which a signal received from one side is outputted to another side, outputting to the other side using a clock extracted from a received signal.

34. A distributed network node according to claim 20, wherein said extended nodes each include a clock processing means for, in a case in which a signal received from one side is outputted to another side, outputting to the other side using a clock extracted from a received signal.

* * * * *